April 27, 1943.    F. PUNGA    2,317,802
LOCOMOTIVE FOR HIGH-VOLTAGE DIRECT CURRENT
Filed Nov. 22, 1940    2 Sheets-Sheet 1

WITNESSES:

INVENTOR
Franklin Punga.
BY
ATTORNEY

April 27, 1943.   F. PUNGA   2,317,802
LOCOMOTIVE FOR HIGH-VOLTAGE DIRECT CURRENT
Filed Nov. 22, 1940   2 Sheets-Sheet 2

WITNESSES:
C. J. Weller
Wm. C. Groome

INVENTOR
Franklin Punga.
BY
J. M. Crawford
ATTORNEY

Patented Apr. 27, 1943

2,317,802

UNITED STATES PATENT OFFICE 2,317,802

LOCOMOTIVE FOR HIGH-VOLTAGE DIRECT CURRENT

Franklin Punga, Darmstadt, Germany; vested in the Alien Property Custodian

Application November 22, 1940, Serial No. 366,538
In Germany November 24, 1939

13 Claims. (Cl. 172—179)

This invention relates to a locomotive for high-voltage direct current and more particularly to the design of the electrical equipment.

One object of the invention is to provide a locomotive equipment which permits to attain by the use of a control set consisting of a plurality of machines a continuous starting, during which the adhesive weight of the locomotive is completely utilized.

Another object of the invention is to provide a locomotive equipment which is characterized by very simple circuits traversed by the current of the locomotive motors and in which no power circuit breakers for the control as well as no series resistors which cause great losses of power are necessary.

A further object of the invention is to provide a locomotive equipment of such a design that a regenerative braking is easily possible for all speeds when connecting the separately excited motors step by step to one or more machines of the control set without changing the connection during the braking and running.

The invention consists particularly in the fact that the electric equipment of the locomotive comprises a plurality of traction motors each coupled with a vehicle axle as well as a control set connected to the trolley line through the trolley and consisting of a plurality of series-connected direct-current machines coupled with one another and whose voltage is capable of being regulated, and that in combination with these parts switch means are provided with the aid of which the said motors may be connected step by step to one or more machines of the control set in various ways without interrupting the supply of current so that a continuous control of the voltage supplied to the traction motors is possible.

Furthermore, the invention consists in a particular method for controlling the voltage according to which the motors of the vehicle are connected step by step to one or more machines of the control set with the aid of switch means, in which case the voltage of one of the machines is reduced during the control to the same extent as the voltage of one of the other machines is increased from the zero value to a predetermined value. The machine whose voltage is reduced to the zero value can be bridged, whereupon this machine is inserted in the motor circuit.

According to the invention, switch means are furthermore provided, with the aid of which one of the machines of the control set may be series-connected to the supply circuit or trolley line voltage so that it operates as a booster, after the voltage has been regulated to a predetermined value by means of the control set.

Further details of the invention will be apparent from the following description taken in connection with the accompanying drawings, in which in Fig. 1 is shown by way of example the connection diagram for the electric equipment of a direct-current high-voltage locomotive for 3,000 volts in which a control set consisting of three machines is provided for starting and controlling the traction motors.

Figure 1:
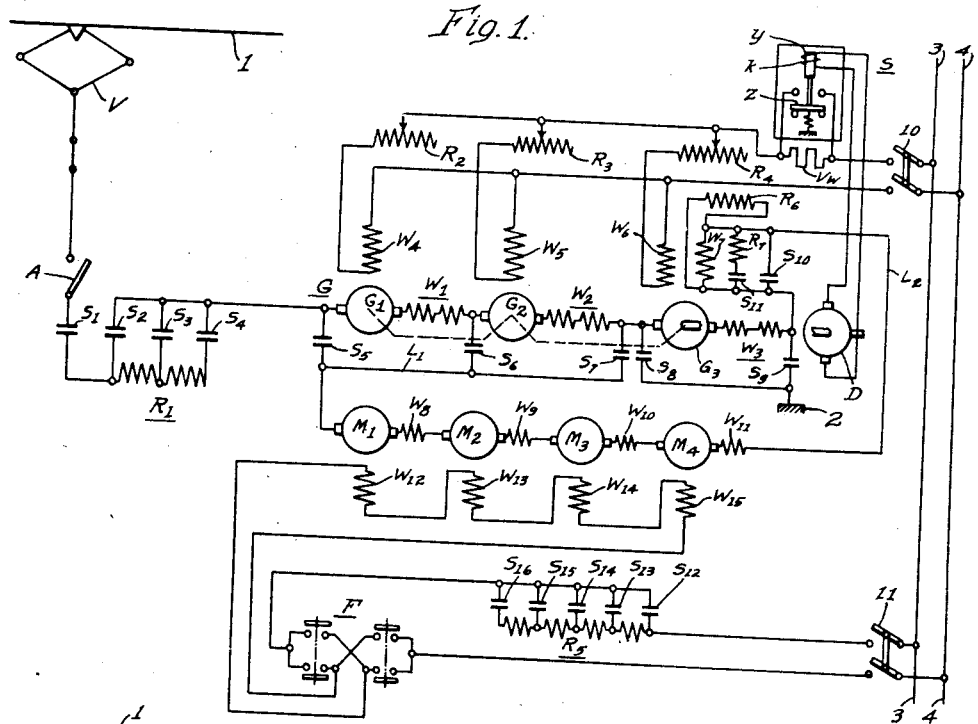

In Fig. 1, G denotes the control set consisting of the three mechanically coupled direct-current machines $G_1$, $G_2$ and $G_3$. The individual machines $G_1$—$G_3$ of the set G are connected in series with the respective armatures thereof and may be connected to the trolley V through the power contactor $S_1$ and the automatic circuit breaker A, the voltage of 3,000 volts being taken from the trolley line 1 through the trolley V. At the side opposite to the trolley, the machine set G may be connected to earth as indicated at 2 through the contactor $S_9$. The machines $G_1$, $G_2$, $G_3$ are each provided with an interpole and compensating winding $W_1$, $W_2$ and $W_3$ respectively, which bring about effective ampere turns in the direction of the armature field. Furthermore, the machines $G_1$—$G_3$ are provided with separately excited windings $W_4$—$W_6$. The separately excited windings $W_4$—$W_6$ are connected to the low-voltage bus bars 3 and 4 through the resistance regulators $R_2$, $R_3$, $R_4$ and the circuit breaker 10. The machine $G_3$ has, furthermore, a differential series winding $W_7$, to which a protective resistor $R_7$ is connected in parallel. This winding may be wholly or partly rendered ineffective with the aid of the contactors $S_{10}$, $S_{11}$ and of the parallel resistor $R_7$. The bus bars 3, 4 are fed by an auxiliary converter not shown which is supplied with energy by the trolley line at the primary side.

To start the control set consisting of the machines $G_1$—$G_3$ a regulating resistor $R_1$ is furthermore provided which may be wholly or partly inserted in the circuit through the contactors $S_4$, $S_3$ and bridged through the contactor $S_2$. The locomotive is driven by the traction motors $M_1$—$M_4$ coupled with the driving axles and provided with the interpole windings $W_8$—$W_{11}$. The motor armatures are connected in series and are energized by each of the exciting windings $W_{12}$—$W_{15}$ which may be connected in series also with the low-voltage bus bars 3 and 4 through the common regulating resistor $R_5$ and the circuit breaker 11. The regulating resistor $R_5$ may be cut out, wholly or partly inserted in the circuit through the contactors $S_{12}$—$S_{16}$. In the energizing circuit of the motors is further arranged a reversing switch F which serves to close the exciting circuit and permits at the same time to change the direction of current. The switch F may therefore serve to adjust the direction of travel of the vehicle.

Besides the contactor $S_9$ as mentioned above also the contactors $S_5$—$S_7$ are provided in the connection. These contactors permit to connect in a different manner the current supply conductor $L_1$ for the motors $M_1$—$M_4$ to the machines $G_1$—$G_3$ of the control set G. The other current supply conductor $L_2$ is permanently connected to the differential series winding $W_7$ series-connected to the armature of the machine $G_3$. By opening the contactor $S_9$ the conductor between the machines $G_2$ and $G_3$ may be connected to ground as indicated at 2 through the contactor $S_8$.

The operation of the above-described control system is as follows:

When putting the locomotive into operation, the motor-generator set is first started with the aid of the starter rheostat $R_1$ as soon as the automatic circuit breaker A, the main contactor $S_1$ and the contactor $S_9$ have been closed. At first the entire starter rheostat $R_1$ is inserted in the circuit extending through the contactor $S_4$. The starter rheostat $R_1$ is then bridged step by step with the aid of the contactors $S_3$ and $S_2$. The excitation of the machines $G_1$ and $G_2$ was already adjusted upon closure of the circuit breaker 10 to such a value as to permit the motor generator G to assume a predetermined normal speed. If a high-speed regulator is provided a predetermined speed of the motor-generator set is brought about by the same. The voltage of the machine $G_3$ is at first equal to zero, since the machine $G_3$ is deenergized. The machines $G_1$, $G_2$ are so dimensioned that each machine is supplied with half the supply circuit voltage U. Should the motors $M_1$—$M_4$ be started, they are energized in accordance with the desired direction of travel upon the closure of the circuit breaker 11 at first with the aid of the reversing switch F. By closing the contactor $S_{12}$, the series resistor $R_5$ lying in the energizing circuit of the field windings $W_{12}$—$W_{15}$ is cut out. Furthermore, the armature circuit of the motors $M_1$—$M_4$ is connected to the machine $G_3$ through the contactor $S_7$. Furthermore the contactor $S_{10}$ is closed. In this case the circuit is as follows: Armature of the machine $G_3$, interpole and compensating winding $W_3$, contactor $S_{10}$ (by means of which the differential series winding $W_7$ of the machine $G_3$ is short-circuited), conductor $L_2$, interpole winding $W_{11}$, motor armature $M_4$, interpole winding $W_{10}$, motor armature $M_3$, interpole winding $W_9$, motor armature $M_2$, interpole winding $W_8$, motor armature $M_1$, conductor $L_1$, contactor $S_7$, armature of the machine $G_3$.

During the starting of the motors the machine $G_3$ is therefore energized to a further extent of the resistance regulator $R_4$ so that the machine $G_3$ supplies an increasing voltage. As the voltage of the machine $G_3$ increases, the voltage of the machine $G_2$ is decreased by actuating the resistance regulator $R_3$ lying in the exciting circuit of the winding $W_5$. The simultaneous decrease in voltage of the machine $G_2$ during the increase in voltage of the machine $G_3$ is necessary, since the total voltage of the machine set G connected to the supply circuit voltage must not be varied. The voltage supplied to the series-connected motors $M_1$—$M_4$ by the machine $G_3$ is controlled until the voltage of the machine $G_3$ attains its maximum value which owing to the dimensioning of the machine $G_3$ is equal to half the value of the trolley line voltage U. Since the voltage of the machine $G_2$ is at the same time reduced to the zero value, the contactor $S_6$ is closed, whereby the machine $G_2$ is temporarily short-circuited, whereupon the contactor $S_7$ is opened. The energizing current and therefore the voltage of the machine $G_2$ is again increased, whereas the current and therefore the voltage of the machine $G_1$ is decreased to the same extent with the aid of the resistance regulator $R_2$. The voltage of the traction motors increases with increasing voltage of the machine $G_2$ to the full value of the trolley line voltage U, if the voltage of the machine $G_2$ is increased to the value $U/2$. Since the voltage of the machine $G_1$ is simultaneously reduced to the zero value, the contactor $S_5$ may be closed and the contactor $S_6$ opened.

In the following intermediate regulating steps, the voltage of the machine $G_3$ is reduced to the zero value by the regulator $R_4$, whereas the voltage of the generator $G_1$ is adjusted to the value $U/2$ by the resistance regulator $R_2$. The contactor $S_8$ may now be closed and the contactor $S_9$ opened so that the conductor connecting machines $G_2$ and $G_3$ is connected to earth as indicated at 2.

If a further increase in voltage supplied to the motors is desirable the machine $G_3$ may again be energized so that a higher voltage than the supply circuit voltage is supplied to the motors. The highest voltage which may be supplied to the motors should exceed the supply circuit voltage by 50% (i. e. to say, it amounts to 4,500 volts). Owing to the changing over of the ground terminal of the machine set G, the electrical stress of the motors is reduced, since the ground connection of the converter set is changed. Owing to the dimensioning of the machine $G_3$ a control voltage lying between U and 1.5 U may be continuously supplied to the motors.

Immediately after the attainment of the full trolley line voltage supplied to the motors, the differential series winding of the machine $G_3$ is energized by disconnecting the bridging contactors 10 and when inserting the contactor $S_{11}$ in the circuit the differential series winding $W_7$ is at first closed with the shunt resistance $R_7$. As soon as the contactor $S_{11}$ has been opened approximately the full current of the traction motors flows through the differential series winding which causes upon an increase in current of the traction motors the voltage supplied to the motors to be reduced.

A compounding effect may also be brought about by providing the motors $M_1$—$M_4$ with compound windings through which the armature current flows instead of providing the machine $G_3$ with the differential series winding.

Furthermore, a variation of the field strength of the traction motors is brought about during the control. As long as a predetermined voltage of the traction motors $M_1$—$M_4$, for instance, the trolley line voltage $U$, has not been attained, the contactor $S_{12}$ remains in the circuit so that the maximum value of the exciting current of the traction motors is obtained. Owing to the energization of the contactor $S_{13}$ and deenergization of the contactor $S_{12}$ a portion of the regulating resistor $R_5$ is inserted in the energizing circuit and the energizing current is thereby reduced which now corresponds to about the continuous rating of the motors.

The speed of the locomotive may be further increased upon the attainment of the greatest control voltage of the traction motor armatures by the fact that the excitation of the motors is weakened with the aid of the contactors $S_{14}$, $S_{15}$, $S_{16}$.

The individual switch devices, contactors and resistance regulators employed in the connection are combined in a known manner to form a switch mechanism so as to ensure a proper sequence of the switching operations. The construction of such a switch mechanism is well known to those skilled in the art so that a description of the same is not deemed necessary.

An essential feature of the invention lies in the fact that the total weight of the locomotive equipment according to the invention does not practically exceed the weight of a standard locomotive with a resistance controller. It will readily be apparent that in the equipment described above, the machine $G_3$ must be rated for the normal current $J$ and for half the supply circuit voltage $$\left(\frac{U}{2}\right)$$

i. e., for ⅓ of the motor output $N$, $N$ denoting the power of all traction motors at maximum voltage, i. e., equal to 1.5 x $U$ x $J$. The machines $G_1$ and $G_2$ must be approximately rated for $$\frac{N}{3}$$

The machine $G_3$ is therefore somewhat larger, the machines $G_1$ and $G_2$ are somewhat smaller in size than a traction motor which is to be rated for ¼ $N$. If the equipment according to the invention is compared with the usual equipment for direct-current high-voltage locomotives, the equipment designed according to the invention is not more disadvantageous as to the weight than the known equipments despite the use of a control set, since the motors may be dimensioned under considerably more favorable conditions. In a locomotive for a trolley line voltage of 3,000 volts having four driving axles eight motors must be generally employed in the case of a resistance control, each of which is rated for 1,500 volts so as to enable the use of a series-connection, a series-parallel-connection and a parallel connection. In this case the motors have relatively unfavorable dimensions owing to the high voltage. In the system described above only four motors are necessary. These motors may be designed in a considerably more advantageous manner, since the voltage thereof is much smaller and amounts at most to $$\frac{4,500}{4}=1,125 \text{ volts}$$

and since a higher peripheral speed may be attained owing to the use of a parallel winding, which is not possible in motors rated for 1,500 volts. The reduction in weight of the motors obtained by the invention enables the use of the control set without increasing the total weight of the equipment, whereby the great advantage is presented in that a continuous control free of resistance losses may be attained as well as a regenerative braking in the case of any speed. A relatively small weight of the equipment of the vehicle may also be obtained by the fact that series resistors rated for a greater power and a considerable number of power contactors which are necessary in the usual resistance control system may be dispensed with.

The equipment as shown in Fig. 1 may be modified in various ways.

The operation of the above-described equipment is in principle not altered in any way by the fact that the voltage of the machine $G_3$ is chosen smaller than half the circuit supply voltage $$\frac{U}{2}$$

For instance, the machine $G_3$ may be rated for 1,200 volts. In this case the control voltage would lie between 3,000 and 4,200 volts and the maximum voltage of each traction motor would amount to 1,050 volts. In this case the machine $G_3$ is to be rated for $$\frac{N}{4}$$

The machines $G_1$ and $G_2$ must be so dimensioned that they produce together with the machine $G_3$ at most a voltage of about 3,000 volts. To this end, the machines $G_1$ and $G_2$ must be able to produce a maximum voltage of 2,000 volts.

Furthermore, the above-described equipment may be modified in the manner that instead of three machines for half the circuit supply voltage (trolley line voltage) four or in general $n$ machines having each a voltage of $$\frac{U}{3} \text{ or } \frac{U}{n-1}$$

volts may be employed. This is particularly the case if the trolley line voltage $U$ is equal to or greater than 3,000 volts.

Moreover, an automatic regulator may be provided for maintaining the speed of the control set $G$ constant (see Fig. 1). In this case a tachometer generator $D$ which supplies a voltage proportional to the speed of the machine set $G$ is coupled with the latter. This voltage is supplied to a suitable high-speed regulator $S$ and is applied across the terminals of the voltage coil $K$. By the spring-biased armature $Y$ of the high-speed regulator $S$ a series resistor $VW$ is periodically switched in and out in the circuit of the energizing windings $W_4$—$W_6$ of the machines $G_1$—$G_3$ by means of the contact $Z$. By the operation of the regulator depending upon the tachometer generator, the speed of the control set $G$ consisting of a plurality of machines is maintained constant in a known manner.

Instead of a series connection, a series-parallel connection of the traction motors may also be employed in the above-described vehicle equipment. The starting of the motors is then effected in such a manner that the voltage of the traction motors connected in series is first increased in the manner described above to the value of the trolley line voltage $U$, whereupon as soon as the motors have been disconnected the voltage is reduced to half the value, the motors are connected in parallel connection to the reduced voltage and the voltage is then again increased.

The above will be explained by reference to the connection diagram shown in Fig. 2.

Figure 2:
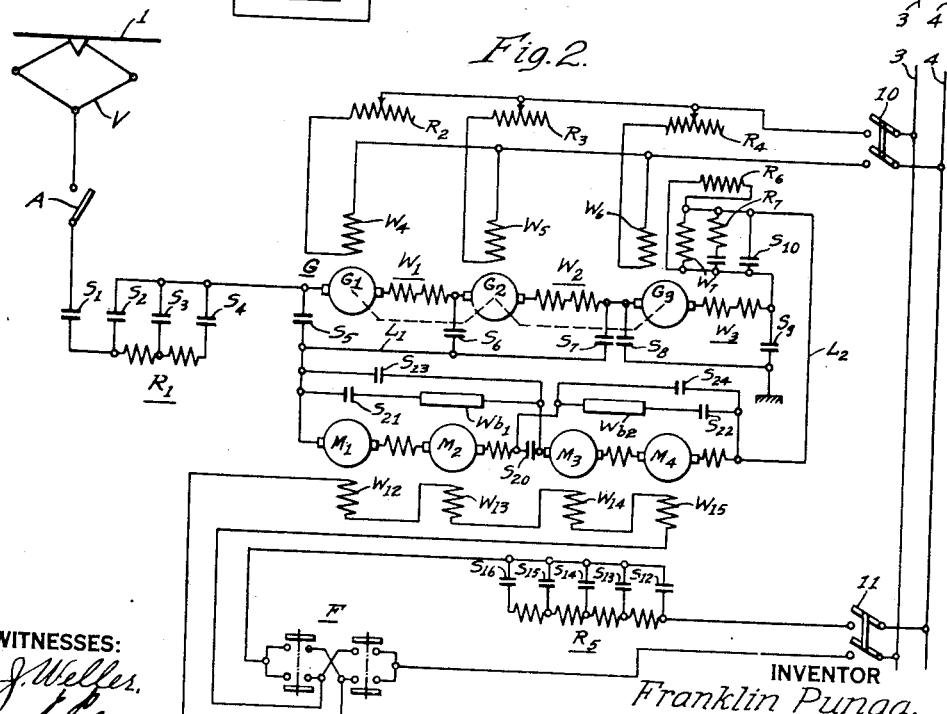
Fig. 2 shows a modification of the equipment in which particular means are provided in order to enable during the starting an operation of the traction motors in groups one after the other in series-connection and parallel-connection.

The connection shown in Fig. 2 corresponds as to the arrangement of the machines $G_1$—$G_3$ to the above-described arrangement according to Fig. 1, except that the motors are connected in a different manner. Between the motors $M_2$ and $M_3$ is arranged a contactor $S_{20}$ in the conductor connecting both motors. Furthermore, the bridging resistors $W_{b1}$ and $W_{b2}$ are provided which are parallel-connected to the two motor sets in an over-crossed manner by means of the contactors $S_{21}$, $S_{22}$ before the bridge contactor $S_{20}$ can be released when passing from the series connection to the parallel connection of the motors.

During the starting, the motors $M_1$—$M_4$ are first connected in series so that the contactor $S_{20}$ is closed. The starting in the case of series-connected motors is effected at first in the manner as described in connection with Fig. 1 until the motors with the contactor $S_6$ inserted in the circuit and the voltage of the machine $G_2$ increased to the maximum value $$\frac{U}{2}$$

are connected to the trolley line voltage U, whereas the voltage of $G_1$ is zero. The motors are now temporarily disconnected from the control set G and parallel connected through the bridging resistors ($W_{b1}$ and $W_{b2}$), whereby the contactors $S_{21}$ and $S_{22}$ are first closed and then the contactor $S_{20}$ is opened. When changing over, the regulating resistor $R_5$ in the energizing circuit of the motors is completely inserted in the circuit through the contactor $S_{16}$ so as to reduce the exciting current so that the fields of the motors are considerably weakened. At the same time the voltage of the machine $G_2$ is again reduced to the zero value, whereas the voltage of the machine $G_1$ is increased to the value $$\frac{U}{2}$$

The two parallel-connected groups of motors may be connected after strengthening the fields by short-circuiting the resistor $R_5$ with the aid of the contactor $S_{12}$ to the generator $G_2$ through the contactor $S_6$. The bridging resistors $W_{b1}$, $W_{b2}$ are then bridged by the contactors $S_{23}$ and $S_{24}$, whereupon the voltage supplied to the motors may be increased to the value U by increasing the voltage of the machine $G_2$ and by reducing the voltage of the machine $G_1$.

A further increase in voltage may be brought about in the manner mentioned above.

A control of the voltage of the traction motors beyond the value of the supply circuit voltage may be dispensed with in some cases, in order to diminish the voltage of the armatures of the traction motors and at the same time the dimensions of the machine $G_3$ which then will be only slightly loaded during normal running time.

Under circumstances it is preferable to employ instead of shunt motors, motors with a series excitation which have a series characteristic. In this case a disconnection of the traction motors from the control set is not necessary in the case of the series-parallel connection.

Figure 3:
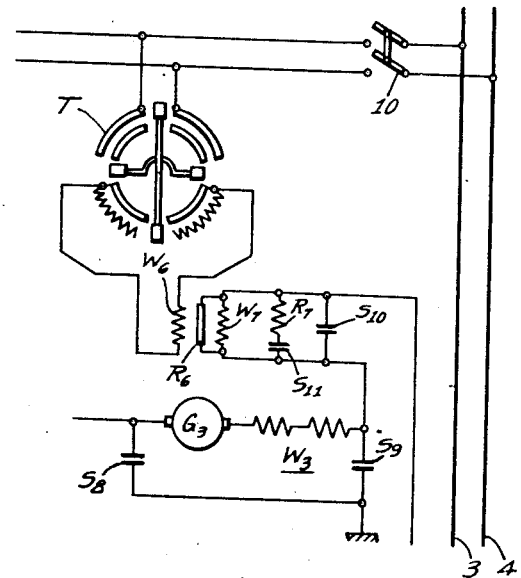
Fig. 3 shows another modification of the electric equipment in which one of the machines of the control set which may be employed during the control in booster connection is provided with a reversing regulator in order to enable a reversal of the voltage of this machine.

Fig. 3 which for the sake of simplicity shows only the machine $G_3$ represents a further advantageous modification and improvement of the above-described equipment. Otherwise the equipment is designed in the same manner as shown in Fig. 1. As will be seen from Fig. 3, a reversing regulator T is provided for the field control of the machine $G_3$. The motors are controlled in this arrangement also in the manner as described in connection with Fig. 1. However, a positive or negative additional voltage amounting to half the supply circuit voltage may be produced in the machine $G_3$ with the aid of the reversing regulator T after the motors have been connected to the full supply circuit voltage U and the machine $G_3$ operates as a booster. By simply actuating the reversing regulator T the desired additional potential may be adjusted at will.

The reversing regulator T may also be employed with the control device in the zero position for shunting purposes without it being necessary to change over the reversing switch F. To this end, a negative voltage is produced in the machine $G_3$ by the reversing regulator T when the traction motors are connected to the machine $G_3$.

As the negative voltage is produced in the machine $G_3$, the voltage of the other machines of the control set G must be increased by varying the excitation of the machines of the control set G.

Under circumstances it may be preferable to connect only the machines $G_1$ and $G_2$ to the supply circuit voltage by closing the circuit breaker A, the contactors $S_1$ and $S_8$ and to connect the traction motors alone to the machine $G_3$. By varying and reversing the excitation by means of the reversing regulator T a shunting may be effected in both directions at reduced speed.

In the embodiment shown in Fig. 1 the control and therefore the change-over from the starting to the permanent connection is effected continuously, i. e., without interrupting the supply of the current to the traction motors. A change may be readily brought about in the manner that the interruption of the supply of the current to the traction motors is effected in order to attain a permanent running step already at a voltage lying below the circuit supply voltage.

Figure 4:
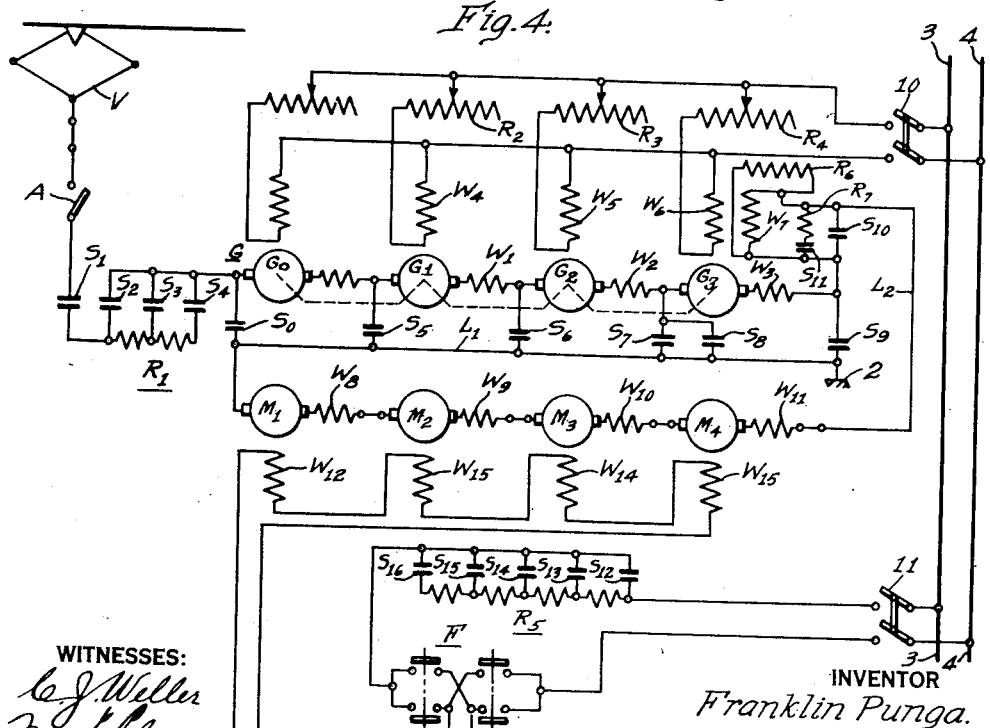
Fig. 4 shows a further advantageous modification of the electric equipment which enables during the control at a relatively low voltage a changing-over to a running step in the case of a simultaneous interruption of the current supply, one of the machines of the control set being differentially connected as a booster to the supply circuit voltage.

Fig. 4 shows an equipment in which the starting and control is effected with the aid of a control set consisting of four machines $G_0$—$G_3$. The connection is substantially the same as that shown in Fig. 1 except that besides the additional machine $G_0$ also the additional contactor $S_0$ is provided. Assuming that the supply circuit voltage amounts to 3,000 volts, the first three machines $G_0$—$G_2$ are rated for a maximum voltage of 1,350 volts and a permanent voltage of 1,150 volts, the fourth machine $G_3$ for a maximum voltage of 900 volts and a permanent voltage of 760 volts. In the manner as described in connection with Fig. 1, a control voltage variable at will may be supplied to the motors. In this case it is to be noted that the machines $G_0$—$G_3$ are dimensioned in such a manner that they will be greatly overloaded during the starting or during temporary control operations.

If the motors $M_1$—$M_4$ are connected to the machines $G_3$ and $G_2$ through the contactor $S_8$ the maximum voltage thereof amounts to 2,250 volts. A favorable permanent running step corresponding to this voltage may be easily established by connecting the machine $G_3$ to the supply circuit in differential connection so that the traction motors are supplied with a voltage equal to the supply circuit voltage reduced by the voltage of the machine $G_3$. If the supply circuit voltage amounts to 3,000 volts there results a voltage applied to the traction motors of 2,100 volts in the case of a counter-voltage of 900 volts.

In order to establish the above-mentioned connection the control is effected as follows: Since the machine $G_1$ is deenergized, the contactor $S_5$ is first closed and the contactor $S_6$ is opened so as to connect the traction motors to the series-connected machines $G_1$—$G_3$. The machine $G_1$ is now energized to a further extent, whereas the machine $G_3$ is deenergized. The voltage applied to the motors is therefore not varied. The contactor $S_8$ is now closed, whereby the conductor connecting the machines $G_2$ and $G_3$ is connected to earth as indicated at 2, and at the same time the contactor $S_9$ is opened. The total supply circuit voltage is therefore applied to the machines $G_0$—$G_2$. The motors $M_1$—$M_4$ are now disconnected by the contactor $S_5$. Furthermore, the machine $G_3$ is negatively energized to such an extent that a counter-voltage of 800 volts is produced in this machine. The contactor $S_0$ is then closed. A voltage equal to the circuit supply voltage reduced by the voltage of the machine $G_3$, i. e., a voltage of 3,000—800=2,200 volts, is applied to the motors which may be permanently operated at this voltage. In the machine $G_3$ the differential series winding $W_6$ serving to damp both when switching in the motors again and in the case of voltage fluctuations the current surges is rendered effective by releasing the contactors $S_{10}$ and $S_{11}$. By the use of known devices it may be arranged that the motors be switched in again only at the proper counter-voltage.

What is claimed is:

1. An electrical equipment for direct-current locomotives comprising a plurality of driving motors coupled with the vehicle axles, a control set connected through the trolley to the trolley line and consisting of a plurality of mechanically coupled series-connected direct-current machines whose voltages are capable of being individually regulated, in combination therewith, of switch means adapted to connect said motors step by step to one or more of the machines of the control set and means to regulate the voltage distribution of said machines to thereby control the voltage supplied to the motors without interrupting the supply current to said motors.

2. An electrical equipment for direct-current locomotives comprising a plurality of driving motors for the vehicle axles, a control set connected through the trolley to the trolley line and consisting of a plurality of mechanically coupled series-connected direct-current machines whose voltages are capable of being separately regulated, in combination therewith, of switch means adapted to connect said motors step by step to one or more of the machines of the control set without interruption of the motor circuit, means to regulate the voltage distribution of said machines to control the voltage supplied to said motors, and means to connect the motors in groups in series or in parallel.

3. An electrical equipment for direct-current locomotives comprising a plurality of continuously series-connected direct-current motors for the vehicle axles with exciting windings connected to a separate current source, a control set connected through the trolley to the trolley line and consisting of a plurality of mechanically coupled series-connected direct-current machines whose voltages are capable of being individually regulated, in combination therewith, of switch means adapted to connect said motors step by step to one or more of the machines of the control set, and means to regulate the voltage distribution of said machines to thereby control the voltage supplied to the motors without interrupting the supply current to said motors.

4. An electrical equipment for direct-current locomotives comprising a plurality of driving motors coupled with the vehicle axles, a control set connected through the trolley to the trolley line and consisting of a plurality of mechanically coupled series-connected direct-current machines whose voltages are capable of being regulated, in combination therewith, of switch means adapted to connect said motors step by step to one or more of the machines of the control set and to regulate the voltage distribution of said machines to thereby control the voltage supplied to the motors without interrupting the supply current to said motors, and control means adapted to regulate the field strength of the motors to control the speed thereof independently of the supply voltage.

5. An electrical equipment for direct-current locomotives comprising a control set connected through the trolley to the trolley line and consisting of a plurality of mechanically coupled series-connected direct-current machines whose voltages are capable of being varied, means for varying the voltage of each of said machines, a plurality of switches as well as a plurality of driving motors coupled with the axles, one current supply conductor of the motors being continuously connected to one terminal of the last machine of the control set, switch means for connecting one pole of said last machine to earth, the other current supply conductor of the motors being capable of being connected in various ways through said plurality of switches to the conductors connecting the other machines of the control set in a step-by-step manner and to the current supply circuit extending from the trolley line to the control set to control the voltage applied to the driving motors from the trolley line without the use of resistors.

6. An electrical equipment for direct-current locomotives comprising a control set connected through the trolley to the trolley line and consisting of a plurality of mechanically coupled series-connected direct-current machines whose voltage is capable of being regulated, a plurality of switches as well as a plurality of driving motors coupled with the axles, one current supply conductor of the motors being continuously connected to one terminal of the last machine of the control set, one pole of which machine is capable of being connected to earth through suitable switches, the other current supply conductor of the motors being capable of being connected in various ways through said switches to the conductors connecting the other machines of the control set and to the current supply circuit extending from the trolley line to the control set, in combination therewith a change-over device for the last machine of the control set adapted to connect the one or the other terminal of this machine to earth so as to connect the said machine together with the other machines of the control set to the supply circuit voltage or to connect it as a booster to the supply circuit voltage applied to the other machines of the control set.

7. An electrical equipment for direct-current locomotives comprising a control set connected through the trolley to the trolley line and consisting of a plurality of mechanically coupled series-connected direct-current machines whose voltage is capable of being regulated, a plurality of switches as well as a plurality of driving motors coupled with the axles, one current supply conductor of the motors being continuously connected to one terminal of the last machine of the control set, one pole of which machine is capable of being connected to earth through suitable switches, the other current supply conductor of the motors being capable of being connected in various ways through said switches to the conductors connecting the other machines of the control set and to the current supply circuit extending from the trolley line to the control set, in combination therewith a change-over device for the last machine of the control set adapted to connect the one or the other terminal of this machine to earth, the said last machine of the control set being rated for being permanently inserted in the circuit.

8. An electrical equipment for direct-current locomotives comprising a control set connected through the trolley to the trolley line and consisting of a plurality of mechanically coupled series-connected direct-current machines whose voltage is capable of being regulated, a plurality of switches as well as a plurality of driving motors coupled with the axles, one current supply conductor of the motors being continuously connected to one terminal of the last machine of the control set, one pole of which machine is capable of being connected to earth through suitable switches, the other current supply conductor of the motors being capable of being connected in various ways through said switches to the conductors connecting the other machines of the control set and to the current supply circuit extending from the trolley line to the control set, in combination therewith a change-over device for the last machine of the control set adapted to connect the one or the other terminal of this machine to earth, a reversing regulator for effecting the reversal of the exciting current and consequently the voltage of said last machine of the control set.

9. An electrical equipment for direct-current locomotives comprising a control set connected through the trolley to the trolley line and consisting of a plurality of mechanically coupled series-connected direct-current machines whose voltage is capable of being regulated, a plurality of switches as well as a plurality of driving motors coupled with the axles, one current supply conductor of the motors being continuously connected to one terminal of the last machine of the control set, one pole of which machine is capable of being connected to earth through suitable switches, the other current supply conductor of the motors being capable of being connected in various ways through said switches to the conductors connecting the other machines of the control set and to the current supply circuit extending from the trolley line to the control set, in combination therewith a change-over device for the last machine of the control set adapted to connect the one or the other terminal of this machine to earth, said last machine being provided with a differential series winding.

10. An electrical equipment for direct-current locomotives comprising a control set connected through the trolley to the trolley line and consisting of a plurality of mechanically coupled series-connected direct-current machines whose voltage is capable of being regulated, a plurality of switches as well as a plurality of driving motors coupled with the axles, one current supply conductor of the motors being continuously connected to one terminal of the last machine of the control set, one pole of which machine is capable of being connected to earth through suitable switches, the other current supply conductor of the motors being capable of being connected in various ways through said switches to the conductors connecting the other machines of the control set and to the current supply circuit extending from the trolley line to the control set, in combination therewith a change-over device for the last machine of the control set adapted to connect the one or the other terminal of this machine to earth, with a differential series winding, switch means so as to weaken the effect of the differential series winding and to render the same ineffective.

11. An electric equipment for direct-current locomotives, comprising $n$ driving motors coupled with the axles, a control set connected through the trolley to the trolley line and consisting of a plurality of mechanically coupled series-connected direct-current machines whose voltages are capable of being individually regulated, each of said direct-current machines being rated for a voltage of $$\frac{U}{n-1}$$

volt ($U$=trolley line voltage), in combination therewith, of switch means adapted to connect said motors step by step to one or more of the machines of the control set, and means to regulate the voltage distribution of said machines to thereby control the voltage supplied to the motors without interrupting the supply current to said motors.

12. An electric equipment for direct-current locomotives, comprising a plurality of driving motors coupled with the axles, a control set connected through the trolley to the trolley line and consisting of a plurality of mechanically coupled series-connected direct-current machines whose voltages are capable of being separately regulated and rated for different voltages, in combination therewith, of switch means adapted to connect said motors step by step to one or more of the machines of the control set, and means to regulate the voltage distribution of said machines to thereby control the voltage supplied to the motors without interrupting the supply current to said motors.

13. An electric equipment for direct-current locomotives, comprising a plurality of driving motors coupled with the vehicle axles, a control set connected through the trolley to the trolley line and consisting of a plurality of mechanically coupled series-connected direct-current machines whose voltage is capable of being regulated, a high-speed regulator connected to the voltage proportional to the speed of the control set and adapted to maintain the speed of the control set constant, in combination therewith switch means adapted to connect said motors step by step to one or more machines of the control set in various ways and to thereby control the voltage supplied to the motors without interrupting the supply current to said motors.

FRANKLIN PUNGA.